United States Patent Office 3,285,985
Patented Nov. 15, 1966

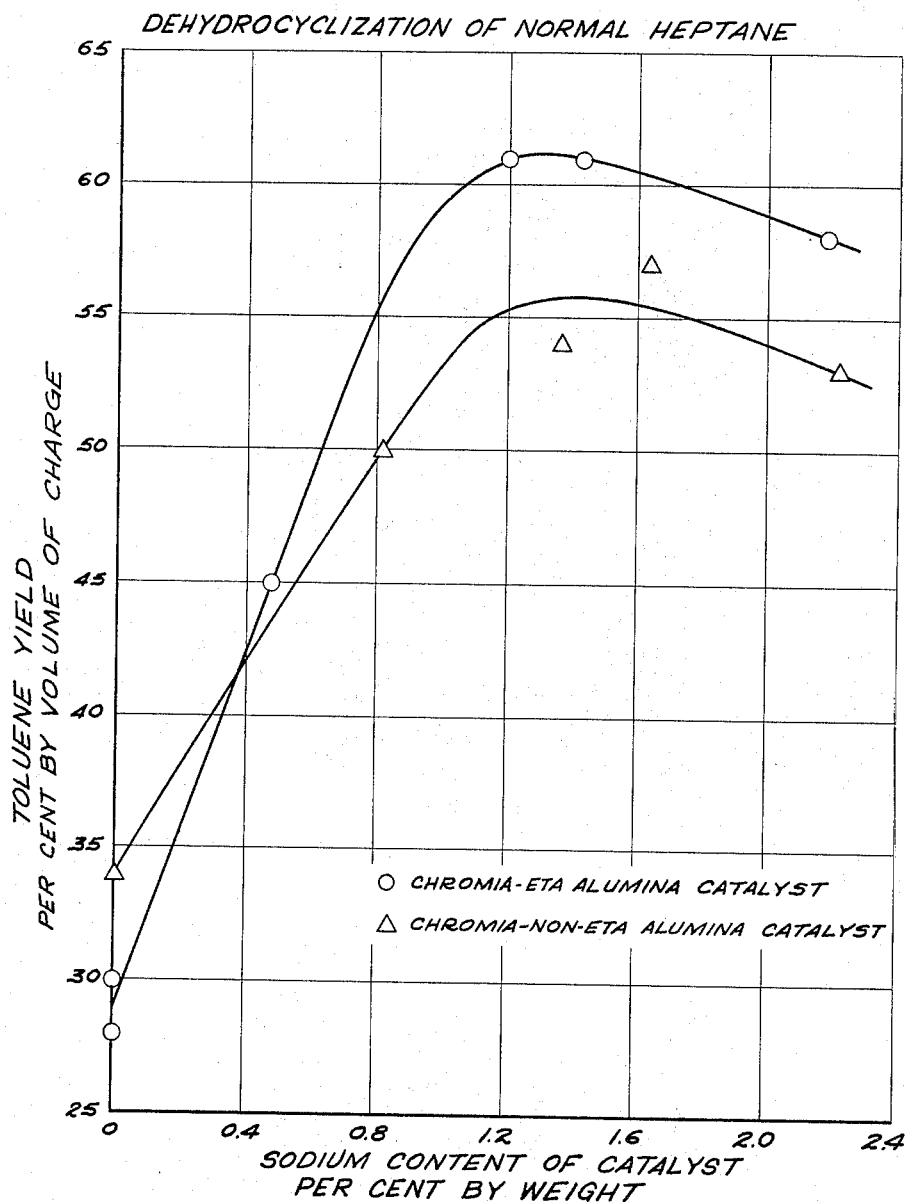

3,285,985
PROCESS FOR DEHYDROCYCLIZATION OF HYDROCARBONS
Robert E. Kline, Pittsburgh, and William C. Starnes, Butler, Pa., assignors to Gulf Research & Development Company, Pittsburgh, Pa., a corporation of Delaware
Filed May 1, 1963, Ser. No. 277,292
6 Claims. (Cl. 260—673.5)

This invention relates to an improved catalytic process for dehydrocyclization of hydrocarbons.

Low octane aliphatic and naphthenic hydrocarbons containing at least six carbon atoms per molecule in an unbranched chain, either as single compounds or as mixtures, are upgraded in octane ratings by dehydrocyclization processes employing chromia-alumina catalysts. The alumina support utilized in these catalysts advantageously possesses minimal cracking activity since cracking hinders the dehydrocyclization reaction. Any cracking that does occur is deleterious since it reduces production of aromatics, which are the desired products, and disadvantageously increases production of gases and coke. An intermediate stage in the dehydrocyclization conversion of paraffins to aromatics is the dehydrogenation of the paraffin molecule to olefin which is thereupon aromatized and, since an olefinic linkage is highly susceptible to cracking, any significant catalytic cracking activity possessed by the alumina support of the chromia-alumina catalyst diminishes the dehydrocyclization activity of the catalyst.

For the purpose of minimizing cracking activity of chromia-alumina compositions utilized as dehydrocyclization catalysts it is conventional to only employ aluminas of low cracking activity and additionally to add to these compositions small quantities of sodium or potassium. The presence of either sodium or potassium in chromia-alumina compositions imparts greater dehydrocyclization activity and this improvement in dehydrocyclization activity is probably accounted for by the fact that sodium and potassium are commonly known to have the effect of lowering the acidity and thereby reducing the cracking activity of an alumina to which they are added.

We have now discovered that in chromia-alumina compositions when the alumina is present as eta alumina the addition of a metal from the group consisting of sodium or potassium produces an unprecedently high promotional effect upon catalytic activity for dehydrocyclization of aliphatic and naphthenic hydrocarbons containing at least six carbon atoms per molecule in an acyclic, unbranched chain. While chromia-non-eta alumina compositions are generally improved in dehydrocyclization activity by promotion with sodium or potassium, it has now been found that when utilizing chromia-eta alumina compositions the promotional effect of sodium and potassium is unusually great and that a sodium or potassium containing chromia-eta alumina catalyst possesses superior dehydrocyclization activity as compared to similar catalysts containing non-eta aluminas. This superior activity is especially surprising because eta alumina possesses relatively high acidity and greater cracking activity as compared to other aluminas and therefore, in the absence of promotion with sodium or potassium, chromia-eta alumina compositions are inferior in catalytic activity for dehydrocyclization of hydrocarbons as compared to chromia-non-eta alumina compositions. However, the promotional effect for hydrocarbon dehydrocyclization activity of sodium and potassium upon chromia-eta alumina compositions is so much greater than the promotional effect for hydrocarbon dehydrocyclization activity of sodium and potassium upon chromia-non-eta alumina compositions that chromia-eta alumina promoted with sodium or potassium actually possesses greater catalytic activity for dehydrocyclization than is possessed by sodium or potassium promoted chromia-non-eta alumina.

In a series of dehydrocyclization tests, described below, it was found that chromia-eta alumina compositions without added sodium or potassium possessed lower catalytic activity for hydrocarbon dehydrocyclization than was possessed by chromia-non-eta alumina compositions. However, the addition of sodium to chromia-eta alumina resulted in a maximum increase in conversion to aromatics of 110 percent while the addition of sodium to chromia-non-eta alumina resulted in a maximum increase in conversion to aromatics of only 68 percent. Because of the sharp difference in promotional effect, after each catalyst was promoted with sodium the initially less active chromia-eta alumina possessed greater catalytic activity for hydrocarbon dehydrocyclization than the initially more active chromia-non-eta alumina.

It was further found that in a dehydrocyclization reaction with a catalyst comprising sodium promoted chromia-eta alumina there is greater aromatics conversion efficiency at optimum aromatics yield than with a catalyst comprising sodium promoted chromia-non-eta alumina. This discovery is also surprising since in the absence of sodium promotion of each composite there is lower aromatics conversion efficiency with chromia-eta alumina than with chromia-non-eta alumina. This means that the catalyst of this invention produces two advantages: first, it produces the highest yield of aromatics and secondly, this high aromatics yield occurs with relatively few side reactions, such as cracking. The superior selectivity at optimum aromatics yield is illustrated in the data presented below.

Other metals are not equivalent to chromia in the catalyst of this invention. For example, the addition of sodium or potassium to platinum-eta alumina does not produce an advantageous combination in accordance with this invention and therefore the catalyst of this invention does not include a platinum or noble metal containing catalyst.

Other alkali metals or alkaline-earth metals cannot be substituted for sodium or potassium in the catalyst of this invention. For example, good results are not obtained with other metals such as rubidium, lithium, cesium, calcium, magnesium or barium and these metals cannot be substituted for sodium or potassium in accordance with this invention.

The chromia content in the catalyst of this invention, expressed as $Cr_2O_3$, is between 6 and 25 percent of the total catalyst weight. At about 6 weight percent, and definitely at about 10 weight percent, there is sufficient chromia present for this constituent to exert its full catalytic effect. Generally, the chromia content in the catalyst can range between 10 and 25 percent by weight with no observable change in catalytic activity occurring anywhere within this range. Whatever very slight effect variations in chromia content have upon dehydrocyclization activity within the chromia range of 10 and 25 weight percent depends upon the manner by which the chromia is incorporated into the catalyst. Generally, if the catalyst is prepared by impregnation of chromia upon alumina, the chromia content should be about 10 to 14 percent by weight while if the catalyst is prepared by coprecipitation of chromia and alumina the chromia content should be about 20 to 22 percent by weight. But even notwithstanding differences in method of catalyst preparation, the effect upon catalyst activity of varying chromia content within the chromia weight range of 10 and 25 percent is generally so slight as to be undetectable in ordinary testing.

The content of sodium or potassium, expressed as Na or K, individually or with each other, is between about 0.1 and 10 percent of the total catalyst weight generally, preferably between about 0.2 and 2.5 percent of the total catalyst weight, and more preferably between 0.5 and 2.5 percent of the total catalyst weight. Most preferably, the sodium or potassium content in the catalyst is between about 1.0 and 2.0 percent of the catalyst weight.

The catalyst composition consists substantially entirely of chromia, at least one metal from the group consisting of sodium and potassium, and eta alumina. Therefore, substantially the entire portion of the catalyst in addition to chromia and the metal selected from the group consisting of sodium and potassium consists of eta alumina. The eta alumina is advantageously substantially completely free of other forms of alumina and is also substantially completely free of silica in a form and amount capable of imparting cracking activity. For example, coprecipitated silica-alumina composites possess high acidity and high cracking activity and therefore their presence is especially disadvantageous in the catalyst of this invention. However, small amounts of silica, not exceeding about 3 percent by weight of the catalyst, can be impregnated upon the eta alumina, for example, by treatment with ethylorthosilicate or silicic acid, in order to stabilize the catalyst against thermal changes.

The novel chromia-eta alumina-sodium or potassium composites are utilized for the octane number improvement via dehydrocyclization of one or a mixture of low octane hydrocarbons containing at least six carbon atoms per molecule in an aliphatic unbranched or straight chain. The dehydrocyclization reaction conditions are conventional and are not of themselves a part of this invention. These conditions include a temperature between about 975° F. and 1050° F., preferably between 1000° F. and 1025° F., a pressure between about 0 and 20 pounds per square inch gauge, preferably between 0 and 10 pounds per square inch gauge, a space velocity between about 0.3 and 1.0 liquid volumes of hydrocarbon per hour per volume of catalyst, preferably between 0.4 and 0.6 liquid volumes of hydrocarbon per hour per volume of catalyst, and a hydrogen to hydrocarbon ratio between about 500 and 2,500 standard cubic feet per barrel of charge, preferably between 600 and 1,500 standard cubic feet per barrel of charge.

An advantageous dehydrocyclization charge stock for the catalyst of this invention comprises gasoline range hydrocarbons or hydrocarbons within the $C_6$ to $C_{10}$ or $C_{11}$ range. Furthermore, the catalyst of this invention has been tested and found to be highly effective for the dehydrocyclization of very high molecular weight hydrocarbons such as $C_{26}$ or $C_{28}$ paraffin waxes. No matter what the length of the hydrocarbon chain, it is important that substantially all or at least a major proportion of the charge stock comprise molecules which have at least 6 adjacent carbon atoms as an aliphatic straight chain. It is an advantage of the catalyst of this invention that it is highly selective to the dehydrocyclization reaction and is largely ineffective for other reactions, including isomerization. A branched $C_6$ hydrocarbon cannot aromatize without first being isomerized to form a straight $C_6$ chain and because of its lack of isomerization activity the catalyst of this invention is not effective for aromatization of aliphatic branched chains even though such chains possess at least 6 carbon atoms. Data presented below clearly illustrate the lack of dehydrocyclization activity of the catalyst in regard to aliphatic branched $C_6$ hydrocarbons.

The catalyst of this invention can aromatize via dehydrocyclization a major portion of molecules having at least 6 adjacent carbon atoms as an unbranched aliphatic group even if these molecules are highly diluted by other hydrocarbons in a charge stock. Therefore, a wide variety of charge compositions can be employed. However, an advantageous charge is one that contains 70 to 90 percent by weight, or more, of molecules having at least 6 adjacent carbon atoms in an unbranched acylic group and having only 10 to 30 percent by weight, or less, of other molecules such as molecules having 6 adjacent carbon atoms present only in a branched configuration.

The charge stock can contain paraffinic or olefinic hydrocarbons, although a paraffin charge is preferred. The catalyst of this invention will readily aromatize a naphthenic ring having 6 carbon atoms in the ring but, because of its low isomerization activity, the catalyst of this invention is not effective for aromatization of a $C_6$ naphthenic molecule having only 5 carbon atoms in the ring.

A series of normal heptane dehydrocyclization tests were conducted for the purpose of comparing the catalytic activity of chromia-sodium-eta alumina composites of this invention with the activity of chromia-sodium-non-eta alumina composites. In each test the hydrocarbon charge was essentially pure, comprising at least 99 mole percent normal heptane, and was dried over molecular sieves and deoxygenated with dry hydrogen before being charged. The hydrogen employed was 99.5 mole percent pure and was deoxygenated over a palladium catalyst and then dried before being charged. As a result of the pretreatment of the normal heptane and the hydrogen, the normal heptane contained less than 5 parts per million of water and less than 5 milligrams of oxygen per liter and the hydrogen contained neither water nor oxygen.

In each test a 250 cubic centimeter sample of the catalyst under test, sized to 10–20 mesh, was disposed in a stainless steel reactor. Each catalyst tested was first stabilized by heating in air for 16 hours at 1100° F. The normal heptane and hydrogen were preheated simultaneously before each test to a temperature at which the normal heptane was a vapor and then charged upflow through the fixed catalyst bed. The resulting reaction was continued under uniform process conditions for about 5 hours during which time the data shown in Table 1 were taken. The process conditions were the same for each test and included a temperature of 1000° F., a pressure of 10 pounds per square inch gauge, 1500 standard cubic feet of hydrogen per barrel of hydrocarbon, and a space velocity of 0.5 liquid volumes of hydrocarbon per hour per volume of catalyst.

A description of the respective catalysts utilized in the tests of Table 1 and of their manner of preparation is given below.

The support for each of catalysts 1 through 6 consists substantially entirely of eta alumina.

Catalyst 1

The eta alumina support was prepared by first dissolving 5000 grams of $AlCl_3 \cdot 6H_2O$ in 25 liters of water. Then 10 liters of $NH_4OH$ (27 percent $NH_3$) were mixed with 25 liters of water. The $AlCl_3$ solution was added to the $NH_4OH$ solution in a slow stream with constant stirring while maintaining the pH above 9. The precipitate formed was allowed to settle and after decantation the precipitate was washed with 110 liters of aqueous solution containing 1 milliliter of $NH_4OH$ for each 1000 milliliters of water. The precipitate was then dried at 250° F. followed by calcination at 1000° F. to yield substantially pure eta alumina.

The chromia was impregnated upon the eta alumina by dissolving chromium nitrate $Cr(NO_3)_3 \cdot 9H_2O$ in water and warming the solution slightly followed by addition of the solution to a large evaporating dish containing the eta alumina. Exactly the maximum quantity of chromium nitrate solution that could be adsorbed by the eta alumina was utilized. The wet eta alumina was then dried at about 250° F. for 24 hours and calcined by heating to 1000° F. in air for about 16 hours.

The final catalyst comprised 15.7 percent by weight of chromia and 84.3 percent by weight of eta alumina. No sodium was added to the catalyst.

*Catalyst 2*

A commercial eta alumina catalyst in powder form was mixed with a lubricant and binder and tableted to produce 3/16 inch tablets. These tablets were broken to 10–20 mesh and calcined in air at 1000° F. for about 16 hours, during which time the lubricant and binder were burned out.

The chromia was impregnated upon the eta alumina by dissolving chromium nitrate $Cr(NO_3)_3 \cdot 9H_2O$ in water and warming the solution slightly followed by addition of the solution to a large evaporating dish containing the eta alumina. Exactly the maximum quantity of chromium nitrate solution that could be adsorbed by the eta alumina was utilized. The wet eta alumina was then dried at about 250° F. for 24 hours and calcined by heating to 1000° F. in air for about 16 hours.

The final catalyst composition comprised 15.5 percent by weight of chromia and 84.5 percent by weight of eta alumina. No sodium was added to the catalyst.

*Catalyst 3*

A commercial eta alumina catalyst in powder form was mixed with a lubricant and binder and tableted to produce 3/16 inch tablets. These tablets were broken to 10–20 mesh and calcined in air at 1000° F. for 16 hours, during which time the lubricant and binder were burned out.

The chromia was impregnated upon the eta alumina by dissolving chromium nitrate $Cr(NO_3)_3 \cdot 9H_2O$ in water and warming the solution slightly followed by addition of the solution to a large evaporating dish containing the eta alumina. Exactly the maximum quantity of chromium nitrate solution that could be adsorbed by the eta alumina was utilized. The wet eta alumina was then dried at 250° F. for 24 hours and calcined by heating to 1000° F. in air for about 16 hours.

Following the chromia impregnation step, a quantity of sodium hydroxide as required was dissolved in distilled water and the chromia-eta alumina composite was soaked at room temperature in this sodium hydroxide solution. A 3 to 1 volume ratio of solution to catalyst was employed. After a 3 hour soaking time the excess solution was drained from the wet catalyst which was then dried at 250° F. for 24 hours followed by calcination in air at 1000° F. for 16 hours.

The catalyst comprised 14.5 percent by weight of chromia, 85.0 percent by weight of eta alumina and 0.48 percent by weight of sodium.

*Catalyst 4*

This catalyst was prepared in a manner similar to the method of preparation of Catalyst 3.

The catalyst comprised 13.6 percent by weight of chromia, 85.2 percent by weight of eta alumina and 1.20 percent by weight of sodium.

*Catalyst 5*

This catalyst was prepared in a manner similar to the method of preparation of Catalyst 3.

The catalyst comprised 13.3 percent by weight of chromia, 85.3 percent by weight of eta alumina and 1.43 percent by weight of sodium.

*Catalyst 6*

This catalyst was prepared in a manner similar to the method of preparation of Catalyst 3.

The catalyst comprised 13.4 percent by weight of chromia, 84.4 percent by weight of eta alumina and 2.18 percent by weight of sodium.

The alumina content of each of Catalysts 7 through 11 is substantially completely free of the eta form.

*Catalyst 7*

A solution containing dissolved chromium nitrate $Cr(NO_3)_3 \cdot 9H_2O$ was added to a large evaporating dish containing a commercial non-eta alumina. Exactly the maximum amount of the chromium nitrate solution that could be adsorbed by the alumina was utilized. The wet material was then dried at about 250° F. for 24 hours. It was then calcined in air at 1000° F. for 16 hours.

The catalyst comprised 14.5 percent by weight of chromia and 85.5 percent by weight of alumina. No sodium was added to the catalyst.

*Catalyst 8*

Aluminum nitrate $Al(NO_3)_3 \cdot 9H_2O$ chromium nitrate $Cr(NO_3)_3 \cdot 9H_2O$ and ammonium acetate $NH_4C_2H_3O_2$ were dissolved in distilled water. Ammonia gas was added to the solution over a period of 20 minutes during which time the solution was agitated. The amount of ammonia gas added was insufficient to cause precipitation of any hydroxide. Thereupon, this solution was mixed as fast as possible with agitation into an ammonia-water solution containing a slight excess of ammonia. The resulting mixture of coprecipitate and solution was agitated for 10 minutes and then filtered. The filter cake was slurried in distilled water and allowed to settle for about 16 hours. The clear liquid was decanted and the slurry filtered. The filter cake was dried at 150° F. for 96 hours and then vacuum dried at 440° F. and 30 mm. Hg for 24 hours. The dried material was broken to 10–20 mesh and calcined at 1000° F. for 16 hours.

The coprecipitated chromia-alumina was soaked at room temperature in an aqueous solution of sodium hydroxide, the ratio of solution to catalyst being 3 volumes to one volume. After 3 hours soaking time the excess solution was drained from the wet catalyst which was then dried at 250° F. for 24 hours. It was then calcined in air at 1000° F. for 16 hours.

The catalyst comprised 22.0 percent by weight of chromia, 77.2 percent by weight of alumina and 0.82 percent by weight of sodium.

*Catalyst 9*

A solution containing dissolved chromium nitrate $Cr(NO_3)_3 \cdot 9H_2O$ was added to a large evaporating dish containing the same commercial non-eta alumina utilized in Catalyst 7. Exactly the maximum amount of chromium nitrate solution that could be adsorbed by the alumina was utilized and the wet material was dried at about 250° F. for 24 hours and then calcined in air at 1000° F. for 16 hours.

The chromia-alumina was soaked at room temperature in an aqueous solution of sodium hydroxide, the ratio of solution to catalyst being 3 volumes to one volume. After 3 hours soaking time the excess solution was drained from the wet catalyst which was dried at 250° F. for 24 hours and then calcined in air at 1000° F. for 16 hours.

The catalyst comprised 10.2 percent by weight of chromia, 88.4 percent by weight of alumina and 1.37 percent by weight of sodium.

*Catalyst 10*

This catalyst was prepared in a manner similar to the method of preparation of Catalyst 8.

The catalyst comprised 21.7 percent by weight of chromia, 76.7 percent by weight of alumina and 1.64 percent by weight of sodium.

*Catalyst 11*

This catalyst was prepared in a manner similar to the method of preparation of Catalyst 8.

The catalyst comprised 22.3 percent by weight of chromia, 75.5 percent by weight of alumina and 2.22 percent by weight of sodium.

TABLE 1.—COMBINATION OF SODIUM WITH CHROMIA-ETA ALUMINA AND WITH CHROMIA NON-ETA ALUMINA

| Catalyst | Alumina Present as Eta Alumina | Sodium Content Where Added: Percent by Weight of Na in Total Catalyst | Liquid Product: Percent by Weight of Charge | Aromatics: Percent by Volume of Liquid Product | Aromatics: Percent by Volume of Charge | Percent Increase in Volume of charge Converted to Aromatics Due to Sodium Addition | Conversion: Percent of Charge Heptane Converted | Efficiency: Percent of Converted Heptane Which Was Converted to Aromatics |
|---|---|---|---|---|---|---|---|---|
| 1 | Yes | No Na added | 63 | 52 | 28 | | 73 | 54 |
| 2 | Yes | do | 70 | 48 | 30 | | 68 | 61 |
| 3 | Yes | 0.48 | 74 | 74 | 45 | 55 | 84 | 75 |
| 4 | Yes | 1.20 | 80 | 97 | 61 | 110 | 98 | 86 |
| 5 | Yes | 1.43 | 81 | 94 | 61 | 110 | 96 | 88 |
| 6 | Yes | 2.18 | 78 | 94 | 58 | 100 | 96 | 83 |
| 7 | No | No Na added | 70 | 55 | 34 | | 73 | 65 |
| 8 | No | 0.82 | 72 | 85 | 50 | 47 | 91 | 76 |
| 9 | No | 1.37 | 77 | 86 | 54 | 59 | 91 | 82 |
| 10 | No | 1.64 | 79 | 90 | 57 | 68 | 94 | 85 |
| 11 | No | 2.22 | 79 | 83 | 53 | 56 | 89 | 83 |

The graphs shown in the drawing are based upon the data of Table 1. Both the graphs of the drawing and the data of Table 1 show that the optimum chromia-sodium-eta alumina catalyst of this invention was capable of converting 61 percent by volume of the charge to aromatics while the optimum chromia-sodium-non-eta alumina catalyst was capable of converting only 57 percent by volume of the charge to aromatics. It is seen from Table 1 that optimum conversion to aromatics with the catalyst of this invention advantageously was accompanied by a heptane to aromatics conversion efficiency of 88 percent while with the non-eta alumina catalysts optimum conversion to aromatics occurred at a lower heptane to aromatics conversion efficiency. This shows that the catalyst of this invention produces a double advantage. First, it produces more aromatics than other catalysts and, secondly, the optimum yield of aromatics is achieved with the occurrence of less side reactions as compared to the occurrence of side reactions at optimum aromatics yield with a catalyst not of this invention.

The data of Table 1 and the graphs of the drawing show that in the absence of sodium promotion a chromia-eta alumina catalyst produces less aromatics and achieves a lower selectivity for aromatics production than does a chromia-non-eta alumina catalyst. However, as shown in Table 1, the addition of sodium to the chromia-eta alumina catalysts increased aromatics conversion therewith a maximum of 110 percent while the addition of sodium to chromia-non-eta alumina catalysts only increased aromatics conversion a maximum of 68 percent. Also, as shown in Table 1, sodium promotion of chromia-eta alumina resulted in a substantially greater improvement in selectivity for aromatics production than did sodium promotion of chromia-non-eta alumina.

The results illustrated in Table 1 were obtained with each catalyst tested during an initial 5 hour test interval during which the equivalent of 2.5 liquid volumes of hydrocarbon per volume of catalyst were passed over each respective catalyst. Although not indicated in the data, upon completion of the 5 hour test interval during which the data were taken each eta alumina-containing catalyst bed utilized in the tests of Table 1 was regenerated by passing air through it at a temperature between 950° F. and 1100° F. until substantially all carbonaceous deposits were removed. This required 2 to 2.5 hours. Following regeneration, the cycle was repeated and each regenerated eta alumina-containing catalyst was thereupon subjected to another 5 hour dehydrocylization run and a minimum 2 to 2.5 hours regeneration period, the conditions of each subsequent period of dehydrocylization and regeneration, respectively, being essentially unchanged as compared to the first. These dehydrocyclization-regeneration cycles were continued repeatedly for the eta alumina-containing catalysts utilized in the tests of Table 1 and it was found that even after 25, 30, 35 and more of these reaction-regeneration cycles there was substantially no reduction in toluene yield. This demonstrated that the catalysts of this invention possess long life characteristics in addition to high activity for the production of aromatics.

Table 2 shows the results of a test made with potassium, instead of sodium, in combination with chromia-eta alumina. The composition of the chromia-potassium-eta alumina catalyst tested is presented in Table 2 and the test utilizing this catalyst was performed with a similar hydrocarbon and hydrogen charge and under the same dehydrocyclization test conditions as were stated above for the tests of Table 1.

TABLE 2.—COMBINATION OF POTASSIUM WITH CHROMIA-ETA ALUMINA

| Catalyst Composition: Percent by Weight | Liquid Product: Percent by Weight of Charge | Aromatics: Percent by Volume of Liquid Product | Aromatics: Percent by Volume of Charge | Conversion: Percent of Charge Heptane Converted | Efficiency: Percent of Converted Heptane Which Was Converted to Aromatics |
|---|---|---|---|---|---|
| $Cr_2O_3$ 16.4 <br> Eta $Al_2O_3$ 81.8 <br> K 1.8 <br> 100.0 | 81 | 98 | 63 | 99 | 88 |

As shown in Table 2, even superior dehydrocyclization results were obtained in a test utilizing a chromia-potassium-eta alumina catalyst than were obtained with the optimum chromia-sodium-eta alumina catalyst tested. Comparing results shown in Tables 1 and 2, the chromia-potassium-eta alumina catalyst converted 63 percent of the charge to aromatics as an 88 percent heptane to aromatics conversion efficiency, the optimum chromia-sodium-eta alumina catalyst converted 61 percent of the charge to aromatics at an 88 percent heptane to aromatics conversion efficiency, while the optimum chromium-sodium-non-eta alumina catalyst only converted 57 percent of the charge to aromatics at the relatively low heptane to aromatics conversion efficiency of 85 percent. The greater selectivity at optimum aromatics yield is an additional important advantage of the catalyst of this invention.

The results of tests made with metals other than sodium and potassium in combination with chromia-eta alumina are shown in Table 3. The analyses of a chromia-rubidium-eta alumina composite and a chromia-lithium-eta alumina composite are shown in Table 3. The test made with each of the composites of Table 3 was performed with a similar hydrocarbon and hydrogen charge and under the same dehydrocyclization test conditions as were stated above for the tests of Table 1.

TABLE 3.—COMBINATION OF METALS OTHER THAN SODIUM AND POTASSIUM WITH CHROMIA ETA-ALUMINA

| Catalyst Composition: Percent by Weight | | Liquid Product: Percent by Weight of Charge | Aromatics: Percent by Volume of Liquid Product | Aromatics: Percent by Volume of Charge | Conversion: Percent of Charge Heptane Converted | Efficiency: Percent of Converted Heptane Which Was Converted to Aromatics |
|---|---|---|---|---|---|---|
| Cr₂O₃ | 15.7 | 73 | 76 | 47 | 85 | 75 |
| Eta Al₂O₃ | 83.3 | | | | | |
| Rb | 1.0 | | | | | |
| | 100.0 | | | | | |
| Cr₂O₃ | 15.8 | 74 | 61 | 39 | 75 | 72 |
| Eta Al₂O₃ | 83.2 | | | | | |
| Li | 1.0 | | | | | |
| | 100.0 | | | | | |

It is seen from Table 3 that the chromia-rubidium-eta alumina and the chromia-lithium-eta alumina composites are highly inferior as dehydrocyclization catalysts as compared to both chromia-sodium-eta alumina and chromia-potassium-eta alumina and that rubidium and lithium are not equivalent to sodium or potassium in the catalyst compositions of this invention.

A test was made utilizing a chromia-sodium-eta alumina catalyst for the dehydrocyclization of normal hexane. This test was made under the same conditions as stated above for the tests of Table 1, the only difference being that the hydrocarbon in the charge comprised 100 percent normal hexane instead of normal heptane. The composition of the catalyst employed and the results of this test are presented in Table 4.

TABLE 4.—USE OF CHROMIA-SODIUM-ETA ALUMINA CATALYST IN THE DEHYDROCYCLIZATION OF NORMAL HEXANE

| Catalyst Composition: Percent by Weight | | Liquid Product: Percent by Weight of Charge | Aromatics: Percent by Volume of Liquid Product | Aromatics: Percent by Volume of Charge | Conversion: Percent of Charge Hexane Converted | Efficiency: Percent of Converted Hexane Which Was Converted to Aromatics |
|---|---|---|---|---|---|---|
| Cr₂O₃ | 13.5 | 73.0 | 80.1 | 46.3 | 91.7 | 73.9 |
| Eta Al₂O₃ | 85.1 | | | | | |
| Na | 1.4 | | | | | |
| | 100.0 | | | | | |

The results of Table 4 show that normal hexane is considerably more difficult to aromatize than is normal heptane.

Two tests were conducted to illustrate the low dehydrocyclization activity of the catalyst of this invention upon a branched hydrocarbon. In these tests the charge comprised hydrocarbons having 6 carbon atoms in an isomerized rather than an unbranched configuration. These tests utilized the same process conditions stated above for the tests of Table 1. In each test the catalyst comprised 14 percent by weight of chromia, 1.42 percent by weight of sodium, the remainder of the catalyst weight being eta alumina. In the first test the charge was 2-methylpentane. In this first test the conversion to liquid product was 69 percent by weight based upon the charge, of which the aromatic content was only 8 percent by volume based upon the liquid product and only 5 percent by volume based upon the charge. In the second test the charge was 2,2 dimethylbutane. The conversion to liquid product in the second test was 73 percent by weight based upon the charge, of which the aromatic content was only 3 percent by volume based upon the liquid product and only 2 percent by volume based upon the charge. These two tests illustrate the extremely low dehydrocyclization activity of the catalyst of this invention upon a branched or isomerized hydrocarbon feed.

We claim:
1. A process comprising contacting in the presence of hydrogen a hydrocarbon having an acyclic, unbranched chain of at least 6 carbon atoms under dehydrocyclization conditions with a catalyst consisting in major proportion of eta alumina and in minor proportion of chromia and at least one metal from the group consisting of sodium and potassium.

2. A process comprising contacting in the presence of hydrogen a charge comprising a naphthenic hydrocarbon having 6 carbon atoms in a ring under aromatization conditions with a catalyst consisting in major proportion of eta alumina and in minor proportion of chromia and at least one metal from the group consisting of sodium and potassium.

3. A process comprising contacting in the presence of hydrogen a charge comprising in major proportion at least one hydrocarbon selected from the group consisting of hydrocarbons having an aliphatic, unbranched chain of at least 6 carbon atoms and hydrocarbons having 6 carbon atoms in a naphthenic ring under aromatization conditons with a catalyst consisting of chromia, at least one metal from the group consisting of sodium and potassium, and eta alumina, the quantity of chromia being between about 6 and 25 percent of the total catalyst weight, the quantity of metal selected from the group consisting of sodium and potassium being between about 0.1 and 10 percent of the total catalyst weight, and the remainder of the catalyst weight being eta alumina.

4. A process comprising contacting in the presence of hydrogen a charge comprising in major proportion at least one hydrocarbon selected from the group consisting of hydrocarbons having an aliphatic, unbranched chain of at least 6 carbon atoms and hydrocarbons having 6 carbon atoms in a naphthenic ring under aromatization conditions including a temperautre between about 975° F. and 1050° F., a pressure between about 0 and 20 pounds per square inch gauge, a space velocity between about 0.3 and 1.0 liquid volumes of hydrocarbon per hour per volume of catalyst, and a hydrogen to hydrocarbon ratio between about 500 and 2500 standard cubic feet per barrel of charge, in the presence of a catalyst composition consisting of chromia, at least one metal from the group consisting of sodium and potassium, and eta alumina, the quantity of chromia being between about 10 and 25 percent of the total catalyst weight, the quantity of metal selected from the group consisting of sodium and potassium being between 0.2 and 2.5 percent of the total catalyst weight, and the remainder of the catalyst weight being eta alumina.

5. A process comprising contacting in the presence of hydrogen a charge comprising in major proportion at least one hydrocarbon selected from the group consisting of hydrocarbons having an aliphatic, unbranched chain of at least 6 carbon atoms and hydrocarbons having 6 carbon atoms in a naphthentic ring under aromatization conditions including a temperature between about 1000° F. and 1025° F., a pressure between about 0 and 10 pounds per square inch gauge, a space velocity between about 0.4 and 0.6 liquid volumes of charge per hour per volume of catalyst, and at a hydrogen to hydrocarbon ratio between about 600 and 1500 standard cubic feet per hour, with a catalyst composition consisting of chromia, at least one metal from the group consisting of sodium and potassium, and eta alumina, the quantity of chromia being between about 10 and 25 percent of the total catalyst weight, the quantity of metal selected from the group consisting of sodium and potassium being between about 0.5 and 2.5 percent of the total catalyst weight, and the remainder of the catalyst weight being eta alumina.

6. A process comprising contacting a charge consisting substantially entirely of hydrocarbon having an aliphatic, unbranched chain of at least 6 carbon atoms in the molecule under dehydrocyclization conditions in the presence of hydrogen with a catalyst consisting in major proportion of eta alumina and in minor proportion of chromia and at least one metal from the group consisting of sodium and potassium, and aromatizing a major proportion of said hydrocarbon charge.

References Cited by the Examiner

UNITED STATES PATENTS

| | | | |
|---|---|---|---|
| 2,863,826 | 12/1958 | Holcomb et al. | 260—673.5 |
| 2,941,016 | 6/1960 | Schmetterling et al. | 260—673.5 |
| 2,962,536 | 11/1960 | Pitts | 260—673.5 |
| 3,013,089 | 2/1961 | Estes et al. | 260—673.5 |
| 3,114,697 | 12/1963 | Bourne | 260—673.5 |
| 3,202,725 | 8/1965 | Lorz et al. | 260—673.5 |

ALPHONSO D. SULLIVAN, *Primary Examiner.*